United States Patent [19]
Rickley et al.

[11] 3,833,273
[45] Sept. 3, 1974

[54] LABYRINTH TYPE SEAL

[75] Inventors: Samuel S. Rickley, West Boylston; Harry Boghosian, Worcester, both of Mass.

[73] Assignee: Morgan Construction Company, Worcester, Mass.

[22] Filed: July 30, 1973

[21] Appl. No.: 384,045

[52] U.S. Cl. ............................. 308/36.1, 277/56
[51] Int. Cl. ......................... F16c 33/80, F16j 15/44
[58] Field of Search ................. 308/36.1, 36.2; 277/53–56

[56] References Cited
UNITED STATES PATENTS

| | | | |
|---|---|---|---|
| 2,740,647 | 4/1956 | Van Pelt | 277/56 |
| 2,868,574 | 1/1959 | Rich | 308/36.1 |
| 2,955,001 | 10/1960 | Rich | 308/36.1 |
| 3,144,280 | 8/1964 | Sorenson | 308/36.1 |
| 3,239,285 | 3/1966 | Madeira et al. | 308/36.1 |
| 3,776,559 | 12/1973 | Cawthorne | 277/56 |

*Primary Examiner*—Louis R. Prince
*Assistant Examiner*—Robert I. Smith
*Attorney, Agent, or Firm*—Thompson, Birch, Gauthier & Samuels

[57] ABSTRACT

In a rolling mill, an interlocking labyrinth-type seal for a roll neck which is rotatably supported in a chock assembly. The seal includes an inner first sealing element which rotates with the roll neck, an outer second sealing element which is fixed in relation to the chock assembly, and a third sealing element which is carried on and movable axially along one or the other of the aforesaid first or second sealing elements. The sealing elements have axially and/or radially spaced flanges and surfaces which cooperate to define an interlocking sealing labyrinth for preventing the escape of lubricating oil from the bearing, while at the same time preventing the bearing and lubricating oil from becoming contaiminated with rolling lubricant cooling water, mill scale, dirt, etc.

7 Claims, 2 Drawing Figures

LABYRINTH TYPE SEAL

BACKGROUND OF THE INVENTION

1. Field of the Invention

This invention relates generally to seals, and is concerned in particular with interlocking labyrinth-type seals of the type employed in rolling mills to prevent the escape of lubricating oil from roll neck bearings while at the same time preventing the bearings and lubricating oil from becoming contaminated with rolling lubricant, cooling water, mill scale, dirt, etc.

2. Description of the Prior Art

The labyrinth-type seals of the prior art are characterized by inner and outer sealing elements, the former being rotatable with the roll neck and the latter being fixed relative to the chock assembly. The sealing elements are provided with radially extending flanges which cooperate to form a sealing labyrinth. The flanges are normally spaced axially from one another and this lateral spacing or clearance permits some limited axial movement of the roll neck relative to the chock assembly. The axial spacing between the cooperating flanges of the prior art seals is, however, limited by the necessity to maintain the sealing integrity of the labyrinth, and any axial movement of the roll and it's neck beyond this limited extent produces a damaging interface between the cooperating flanges, which in turn significantly shortens the useful life of the sealing labyrinth.

SUMMARY OF THE INVENTION

The present invention obviates the problem outlined above by providing an improved interlocking labyrinth-type seal which has the capability of accommodating a much greater degree of axial roll neck displacement without impairing the sealing integrity of the labyrinth and without damaging the seal components.

To this end, the seal assembly of the present invention includes first and second cooperatively arranged sealing elements, one being rotatable with the roll neck and the other being fixed relative to the chock assembly. One of the aforesaid sealing elements has a cylindrical portion which is arranged coaxially with the rotational axis of the roll neck, and onto which is mounted an axially movable third sealing element.

The aforesaid sealing elements have radially and/or axially spaced cooperating flanges and surfaces which define an interlocking sealing labyrinth. In the preferred embodiment to be hereinafter described in greater detail, the labyrinth has: (1) an outer end section which is effective to exclude contaminants such as rolling lubricant, cooling water, mill scale, dirt, etc., from penetrating into the interior of the bearing; (2) an inner end section which is effective to prevent lubricating oil from escaping from the bearing; and, (3) an intermediate section which insures sealing integrity between the aforesaid end sections.

The axial spacing between the flanges defining the end sections of the sealing labyrinth is relatively pronounced to thereby accommodate substantial axial movement of the roll neck relative to the chock assembly. The intermediate section of the labyrinth is defined by flange means on the third sealing element cooperating with flange means on the sealing element opposite to that on which the third sealing element is carried. The flanges defining this intermediate labyrinth section have only minimum axial spacing or clearance therebetween as compared to the flanges making up the end sections of the labyrinth, but this minimum spacing is compensated for by the ability of the third sealing element to move axially in relation to the sealing element on which it is mounted, with the result that the aforesaid substantial axial movement of the roll neck relative to the chock assembly is still possible, without any resulting damaging interface between the flanges of the intermediate labyrinth section.

Preferably, the third sealing element is molded of a flexible material which is reinforced internally by an embedded metallic ring.

DESCRIPTION OF THE PREFERRED EMBODIMENT

Figure 1:
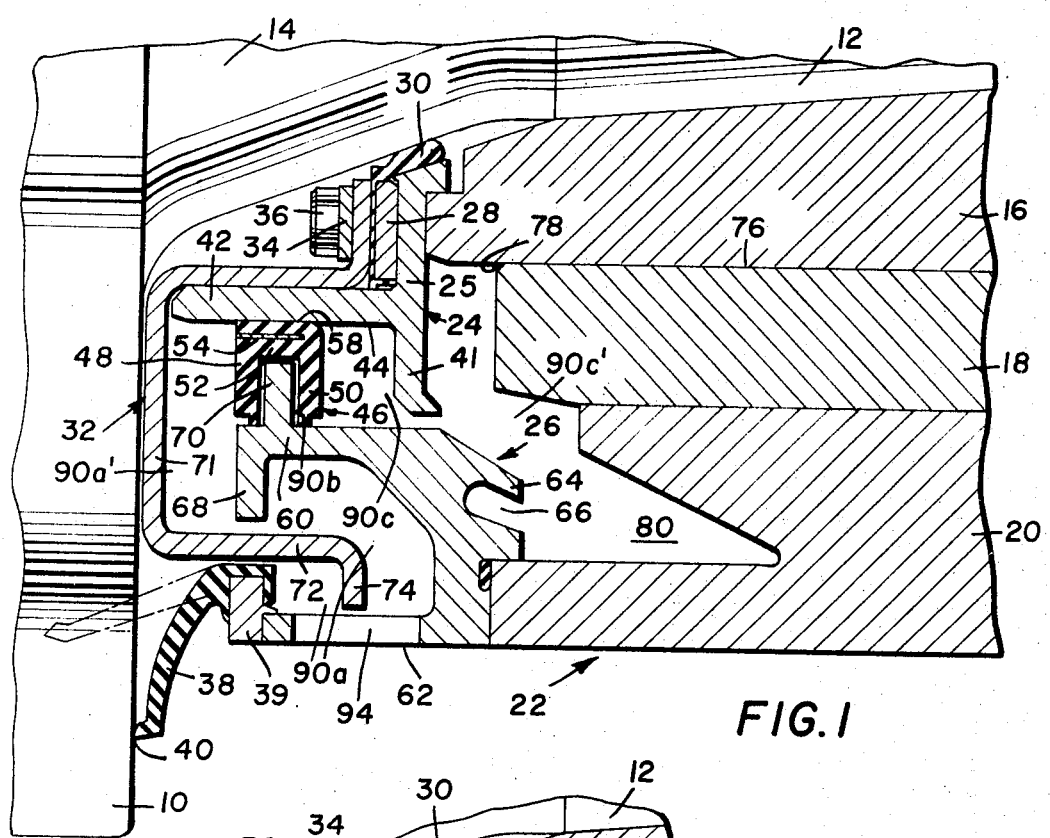
FIG. 1 is a view in cross section of a portion of a bearing which includes a labyrinth-type seal embodying the concepts of the present invention.

Referring now to the drawings, there is shown at 10 a roll having a roll neck 12 with a tapered intermediate portion 14. A bearing sleeve 16 surrounds the roll neck and is keyed to the roll neck by means (not shown) for rotation therewith. The bearing sleeve 16 is journalled for rotation in a fixed bushing 18 which is in turn supported in a roll chock 20. The bushing 18 and chock 20 will hereinafter at times be referred to as a "chock assembly" 22.

The tapered intermediate portion 14 of the roll neck is surrounded by inner and outer cooperatively arranged first and second sealing elements 24 and 26. The inner sealing element 24 includes an annular section 25, a spacer ring 28 having integrally molded thereto a seal 30, a seal ring 32 and a retainer ring 34. A plurality of retainer bolts 36 extend through the assembly of elements 25, 28, 30, 32, and 34 and are threaded into the inside end of the bearing sleeve 16. These components, which are collectively referred to as the inner sealing element 24, thus rotate with the roll neck 12 and bearing sleeve 16. The outer sealing element 26 is fixed to the inside end of chock 20 by other means (not shown). A lip seal 38 is carried on an outer seal ring 39 which is in turn carried on the inside end of element 26. The lip seal 38 sealingly engages the roll end as at 40.

The annular section 25 of the inner sealing element 24 is provided with a radial flange 41 and a cylindrical neck portion 42 which extends coaxially with the rotational axis of the roll neck 12, and which has a polished exterior surface 44.

A third sealing element 46 is carried on the cylindrical neck portion 42. The third sealing element 46 preferably has a generally U-shaped cross-section, with laterally spaced radially outwardly extending flanges 48 and 50 interconnected by an intermediate base section 52. The sealing element 46 is preferably molded of a flexible material, and the base section 52 is preferably reinforced by an embedded integrally molded metallic ring 54. There is a slight interference fit between the inside surface 58 of sealing element 46 and the polished surface 44, which provides an effective seal, yet allows the sealing element 46 to slide axially along the length of the cylindrical neck portion 42.

The outer sealing element 26 has inner and outer annular sections 60 and 62, a lip 64 overlying an end groove 66, and generally oppositely extending radial flanges 68 and 70. The seal ring 32 has an annular section 71 and a cylindrical section 72 which terminates in a radially outwardly extending lip 74.

When the roll 10 is in operation, lubricating oil is fed continuously by known means (not shown) between the bearing interface 76 of bearing sleeve 16 and fixed bushing 18. The oil emerges as at 78 and thereafter is collected in an area 80 where it is drained by means (not shown) and recirculated in a known fashion. Cooling water or a roll lubricant is applied to the roll 10, and this in turn results in the exterior surfaces of the seal and chock assembly being exposed to a mixture of roll lubricant, cooling water, mill scale, dirt, etc. The need to confine the lubricating oil within the bearing, and to isolate both the lubricating oil and the bearing interface 76 from the aforesaid contaminants, can of course be readily appreciated.

To this end, and in light of the foregoing description, it will be understood that seal components of the embodiment herein described cooperate in defining an interlocking sealing labyrinth having an outer end section 90a, 90a', an intermediate section 90b and an inner end section 90c, 90c'. More particularly, the outer labyrinth end section 90a, 90a' is defined by the outer sealing element 26, the portions 71, 72 and 74 of seal ring 32, the end of polished surface 44 and the leg 48 of the third seal element 46. The intermediate labyrinth section 90b is defined by the flange 70 on sealing element 26 and the inside surfaces of the flanges 48 and 50 and the base section 52 of the sealing element 46. The inner labyrinth end section 90c, 90c' is defined by the flange 50 of seal element 46, the inner end of polished surface 44, the flange 41, the outer ends of bearing sleeve 16 and bushing 18, the chock 20 and the outer seal element 26, including lip 64 and groove 66.

Oil emerging at 78 from the bearing interface 76 will as mentioned above collect in area 80 for removal and recirculation. The oil will be prevented from escaping from the bearing by the sealing action of the components making up the labyrinth section 90c, 90c'. The components making up labyrinth section 90a, 90a' insure that contaminants which pass by lip seal 38 will not penetrate into the interior of the bearing. Any such contaminants are eventually drained off through a drain opening 94. The components making up the intermediate labyrinth section 90b insure that oil escaping past flange 41 will be returned to area 80, and that contaminants reaching the upper end of labyrinth section 90a' will be turned back and eventually discharged through opening 94.

Figure 2:
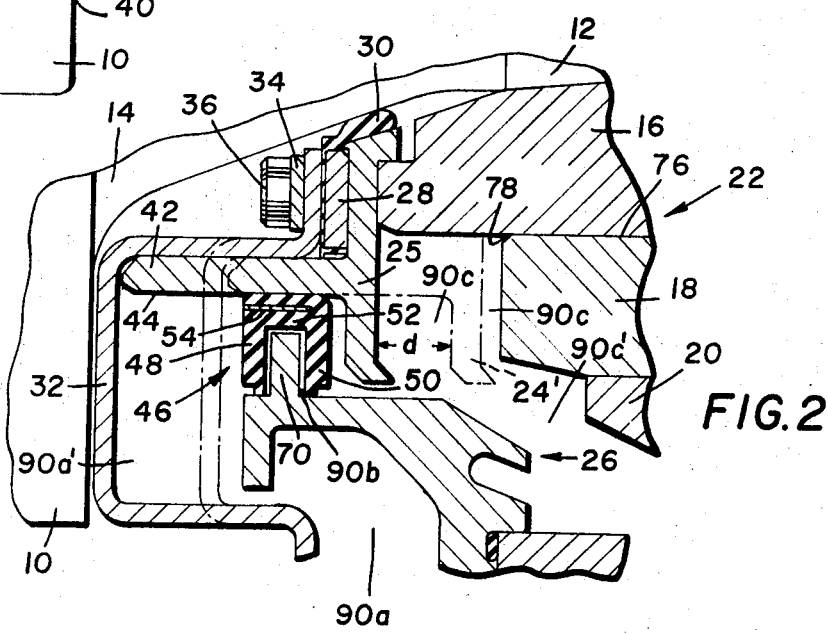
FIG. 2 is a view similar to FIG. 1, but with the roll neck axially displaced from its position as shown in FIG. 1.

It will further be noted that there is pronounced axial spacing between certain of the seal components making up the labyrinth end sections. This is particularly true of the axial spacing between the following components: the flange 68 and the annular section 71 of seal ring 32; the lip 74 on seal ring 32 and the axially opposed surfaces of the outer sealing element 26 and its outer seal ring 39; the flange 41 on the inner sealing element 24 and the end of the fixed bushing 18; and between the flanges 41 and 50. This pronounced axial spacing permits substantial axial movement of the roll neck 12 and the components rotating therewith relative to the chock assembly 22 and the components fixed thereto. The axial spacing between the components making up the intermediate labyrinth section 90b, specifically between flange 70 and flanges 48 and 50, is minimal in comparison to the above-described pronounced axial spacing of other components, yet because of the ability of the third sealing element 46 to slide axially along the length of surface 44, this minimal spacing does not prevent substantial axial movement of the roll neck 12. In other words, the ability of the third sealing element 46 to slide along the cylindrical neck portion 42 of the inner sealing elements 24 is advantageous in that it permits substantial axial movement of the roll neck in relation to the chock assembly 22 without creating a damaging interface between the flange 70 on the outer sealing element 24 and the flanges 48 and 50 of the third sealing element 46. This is illustrated in FIG. 2, wherein the inner sealing element 24, which is fixed relative to and which rotates with the roll neck and its bearing sleeve 16, is shown disposed axially to the extreme left in solid lines, and to the extreme right in dot-dash lines at 24'. This ± displacement, which is indicated diagrammatically in FIG. 2 at "d," is far greater than that normally possible with conventional labyrinth type seals, the latter being limited to the axial clearance normally provided between the cooperating flanges making up the sealing labyrinth.

Having thus described a preferred embodiment of our labyrinth-type seal, it will be apparent to those skilled in the art that numerous modifications may be made without departing from the spirit and scope of the invention. For example, the third sealing element need not necessarily be molded of a flexible material. The third sealing element may be carried on either the first or second sealing elements. The labyrinth need not necessarily be subdivided into a plurality of sections, but instead can comprise only the section defined in part by the third sealing element.

It is our intention to cover these and any other changes and modifications to the embodiment herein chosen for purposes of disclosure which do not depart from the spirit and scope of the invention as claimed:

We claim:
1. In a rolling mill, an interlocking labyrinth-type seal for a roll neck which is journalled for rotation in a chock assembly, said seal comprising: first and second sealing elements, one of said sealing elements being rotatable with the roll neck and the other being fixed relative to the chock assembly; flange means on one of said sealing elements; a third sealing element carried by the other of said sealing elements, said third sealing element having flange means cooperating with said first-mentioned flange means to establish an interlocking sealing labyrinth; and, means permitting axial movement of said third sealing element relative to said other sealing element to thereby accommodate axial movement of said roll neck relative to said chock assembly.

2. The seal as claimed in claim 1 wherein said first and second sealing elements are rigid, and wherein said third sealing element is molded of a flexible material.

3. The seal as claimed in claim 2 wherein said third sealing element is internally reinforced by an integrally embedded reinforcing element.

4. The seal as claimed in claim 1 further characterized by additional flange means on said first and second sealing elements, said flange means collectively defining an interlocking labyrinth having end sections separated by an intermediate section, said intermediate section being defined in part by the flange means on said third sealing element.

5. In a rolling mill, an interlocking labyrinth-type seal for a roll neck which is journalled for rotation in a chock assembly, said seal comprising: a first sealing element rotatable with the roll neck, said first sealing element having a cylindrical portion arranged coaxially with the rotational axis of the roll neck; a flexible sealing element carried by said first sealing element, said flexible sealing element having a generally U-shaped cross section formed by laterally spaced radially outwardly extending flanges joined by an intermediate base section which is in frictional engagement with and slidable along the length of said cylindrical portion; and, a second sealing element carried by the chock assembly and fixed relative thereto, said second sealing element having an inwardly extending radial flange located between said outwardly extending flanges and cooperating therewith to establish an interlocking sealing labyrinth, the sliding relationship between the intermediate base section of said flexible sealing element and the cylindrical portion of said first sealing element being operative to maintain the effectiveness of said sealing labyrinth while permitting axial movement of said roll neck relative to said chock assembly.

6. The apparatus as claimed in claim 5 further characterized by said roll neck being surrounded by a bearing sleeve which is rotatable therewith and to which said first sealing element is attached.

7. The apparatus as claimed in claim 5 wherein the intermediate base section of said flexible sealing element is reinforced by a cylindrical metallic member embedded therein.

* * * * *